United States Patent
Liang et al.

(10) Patent No.: US 12,028,901 B2
(45) Date of Patent: *Jul. 2, 2024

(54) METHOD AND APPARATUS FOR IMPLEMENTING COLLISION DETECTION IN DATA TRANSMISSION

(71) Applicant: HUAWEI TECHNOLOGIES CO., LTD., Guangdong (CN)

(72) Inventors: Dandan Liang, Shenzhen (CN); Ming Gan, Shenzhen (CN); Xin Zuo, Shenzhen (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,278

(22) Filed: Feb. 3, 2023

(65) Prior Publication Data

US 2023/0262775 A1 Aug. 17, 2023

Related U.S. Application Data

(63) Continuation of application No. 17/181,536, filed on Feb. 22, 2021, now Pat. No. 11,589,389, which is a
(Continued)

(30) Foreign Application Priority Data

Aug. 24, 2018 (CN) .......................... 201810975646.X (51) Int. Cl.
*H04W 74/0808* (2024.01)
*H04L 69/22* (2022.01)
(Continued)

(52) U.S. Cl.
CPC ......... *H04W 74/0825* (2013.01); *H04L 69/22* (2013.01); *H04W 72/12* (2013.01); *H04W 74/0816* (2013.01)

(58) Field of Classification Search
CPC ............. H04W 74/0825; H04W 72/12; H04W 74/0816; H04L 69/22
See application file for complete search history.

(56) References Cited

U.S. PATENT DOCUMENTS 8,837,515 B1 * 9/2014 Cai ................... H04W 74/0825
370/445
11,589,389 B2 * 2/2023 Liang ................... H04L 1/1864
(Continued)

FOREIGN PATENT DOCUMENTS

| CN | 103220081 A | 7/2013 |
| CN | 103516472 A | 1/2014 |

(Continued)

OTHER PUBLICATIONS

English translation for WO_2014000475_A1_Zhang (Year: 2014).*
(Continued)

*Primary Examiner* — Chi H Pham
*Assistant Examiner* — Weibin Huang
(74) *Attorney, Agent, or Firm* — Fish & Richardson P.C.

(57) ABSTRACT

Example methods and apparatus for implementing collision detection in data transmission are described. One example method includes sending a data packet including collision detection information to a receive end, where the collision detection information is used by the receive end to perform collision detection on the data packet. A status indication message sent by the receive end is received by the receive end when sending the data packet. The receive end parses the status indication message. If the status indication mes-
(Continued)

sage includes collision information, the receive end perform retransmission of the data packet.

18 Claims, 6 Drawing Sheets

Related U.S. Application Data continuation of application No. PCT/CN2019/081311, filed on Apr. 3, 2019.

(51) Int. Cl.
*H04W 72/12* (2023.01)
*H04W 74/0816* (2024.01)

(56) References Cited

U.S. PATENT DOCUMENTS

| | | | |
|---|---|---|---|
| 2004/0184426 A1 | 9/2004 | Tan | |
| 2005/0117549 A1 | 6/2005 | Kanterakis et al. | |
| 2007/0237168 A1* | 10/2007 | Courtay | H04W 12/122 370/445 |
| 2011/0006885 A1 | 1/2011 | Park et al. | |
| 2013/0077497 A1* | 3/2013 | Bae | H04W 74/0858 370/241 |
| 2013/0121241 A1* | 5/2013 | Sebire | H04W 48/18 370/328 |
| 2014/0269631 A1* | 9/2014 | Jafarian | H04W 74/0825 370/336 |
| 2015/0263877 A1* | 9/2015 | Chang | H04L 27/2692 370/350 |
| 2018/0220463 A1* | 8/2018 | Fodor | H04L 5/14 |

FOREIGN PATENT DOCUMENTS

| | | | |
|---|---|---|---|
| CN | 106658609 A | 5/2017 | |
| CN | 107567106 A | 1/2018 | |
| WO | 2014000475 A1 | 1/2014 | |
| WO | WO-2014000475 A1 * | 1/2014 | ............... H04L 1/18 |
| WO | 2015009499 A1 | 1/2015 | |

OTHER PUBLICATIONS

Burich et al., "On the impact of HARQ on the throughput and energy efficiency using cross-layer analysis," 2017 Wireless Days, Mar. 29-31, 2017, 6 pages.

Extended European Search Report in European Application No. 19852367.2, dated Mar. 22, 2021, 7 pages.

PCT International Search Report and Written Opinion issued in International Application No. PCT/CN2019/081311 on Jun. 17, 2019, 14 pages (with English translation).

* cited by examiner

FIG. 9

METHOD AND APPARATUS FOR IMPLEMENTING COLLISION DETECTION IN DATA TRANSMISSION

CROSS-REFERENCE TO RELATED APPLICATIONS

This application is a continuation of U.S. patent application Ser. No. 17/181,536, filed on Feb. 22, 2021, which is a continuation of International Application No. PCT/CN2019/081311, filed on Apr. 3, 2019, which claims priority to Chinese Patent Application No. 201810975646.X, filed on Aug. 24, 2018. All of the aforementioned patent applications are hereby incorporated by reference in their entireties.

TECHNICAL FIELD

Embodiments of this application relate to the communications field, and in particular, to a method and an apparatus for implementing collision detection in data transmission.

BACKGROUND

Currently, in a scenario in which a carrier sense multiple access with collision avoidance (CSMA/CA) protocol is used (for example, a wireless local area network (WLAN)), a transmit end (which may be an access point (AP), or may be a station (STA)) is in a half-duplex mode. To be specific, the transmit end uses a listen before transmit manner, in which the transmit end can determine that a collision occurs at a receive end only if the transmit end does not receive an acknowledgement (ACK) message within a preset time, and then start a retransmission. Clearly, the transmit end cannot learn in time whether a collision exists at the receive end, thereby resulting in low data packet transmission efficiency.

The transmit end is in a half-duplex mode, and an implementation specified in the protocol is: listen before transmit, that is, after the transmit end first determines that a channel is idle, the transmit end sends a data packet, and then waits for the receive end to return an ACK message, so as to determine that the receive end correctly receives the data packet. If the transmit end does not receive the ACK message within a preset time, it may be determined that a collision event of the data packet exists at the receive end, and then the transmit end starts the retransmission procedure.

Clearly, because the transmit end cannot learn in time whether a collision exists at the receive end, the transmit end needs to wait for preset duration before entering the retransmission procedure, resulting in low data packet transmission efficiency and low channel utilization.

SUMMARY

This application provides a method and an apparatus for implementing collision detection in data transmission, to avoid, to some extent, low data packet transmission efficiency and low channel utilization that are caused because a transmit end cannot learn whether a collision exists at a receive end.

To achieve the foregoing objectives, the following technical solutions are used in this application.

According to a first aspect, an embodiment of this application provides a method for implementing collision detection in data transmission.

The methods includes sending a data packet including collision detection information by a transmit end to a receive end. The receive end performs collision detection on the data packet based on the collision detection information. The transmit end may receive a status indication message sent by the receive end when sending the data packet. Then, the transmit end parses the received status indication message, and if collision information is parsed out from the status indication message, the transmit end performs retransmission of the data packet.

According to the foregoing method, the transmit end can learn in time that a collision event of the data packet exists at the receive end, and immediately perform the retransmission, thereby shortening a waiting time, and improving channel utilization and data transmission efficiency.

In a possible implementation, the collision detection information may be located in a physical layer preamble of the data packet.

According to the foregoing implementation, the receive end preferentially decodes the collision detection information, so that the receive end can detect a collision event of the data packet in time, and notify the transmit end to perform the retransmission of the data packet in time, thereby improving transmission efficiency of the data packet.

In a possible implementation, the collision detection information includes identity detection information and parameter detection information. The identity detection information may be used to enable the receive end to check, based on the identity detection information, whether the data packet is sent to the receive end. The parameter detection information may be used to enable the receive end to perform the collision detection on the data packet based on the parameter detection information when the receive end determines that a result of identity detection is "success".

According to the foregoing implementation, the receive end can preferentially verify an identity and a parameter, so that the receive end can detect a collision event of the data packet in time, and notify the transmit end to perform the retransmission of the data packet in time, thereby improving the transmission efficiency of the data packet.

In a possible implementation, the status indication message includes at least one piece of retransmission parameter information, and the at least one piece of retransmission parameter information is used to indicate the transmit end to perform the retransmission based on the at least one piece of retransmission parameter information.

According to the foregoing implementation, the transmit end can perform the retransmission based on the retransmission parameter information, thereby improving a success rate of the retransmission of the data packet, and further improving the data transmission efficiency.

In a possible implementation, that the transmit end performs the retransmission of the data packet may be: The transmit end stops sending the data packet, and sends the data packet to the receive end again.

According to the foregoing implementation, after learning that a collision event of the data packet exists at the receive end, the transmit end immediately stops transmitting the data packet, and starts a retransmission procedure, thereby shortening the waiting time, and further improving the channel utilization and the data transmission efficiency.

In a possible implementation, that the transmit end performs the retransmission of the data packet may be: The transmit end continues to send the data packet to the receive end, and after the data packet is sent, the transmit end sends the data packet to the receive end again.

According to the foregoing implementation, the receive end can decode the retransmitted data packet and a previously unsuccessfully transmitted data packet together, thereby improving a success rate of decoding the data packet by the receive end, and further improving an overall throughput of a system and the data transmission efficiency.

In a possible implementation, that the transmit end sends the data packet to the receive end again may be: The transmit end determines backoff duration of the data packet based on transmission information of a previous data packet. The previous data packet is a data packet that is most recently successfully sent by the transmit end to the receive end, and the transmission information includes a quantity of times that the transmit end retransmits the previous data packet to the receive end and a transmission efficiency value of the previous data packet. Then, the transmit end sends the data packet to the receive end after the backoff duration.

According to the foregoing implementation, the transmit end calculates the backoff duration by using the transmission information of the previous data packet, to resolve a fairness problem between devices.

According to a second aspect, an embodiment of this application provides a method for implementing collision detection in data transmission. The method includes:

A receive end receives a data packet sent by a transmit end, where the data packet includes collision detection information. Then, the receive end performs collision detection on the data packet based on the collision detection information. The receive end may send a status indication message to the transmit end, where the status indication message includes a result of the collision detection.

In a possible implementation, the collision detection information is located in a physical layer preamble of the data packet.

In a possible implementation, the collision detection information includes identity detection information and parameter detection information. The identity detection information is used to enable the receive end to check, based on the identity detection information, whether the data packet is sent to the receive end. The parameter detection information is used to enable the receive end to perform the collision detection on the data packet based on the parameter detection information when the receive end determines that a result of identity detection is "success".

In a possible implementation, the status indication message includes at least one piece of retransmission parameter information, and the at least one piece of retransmission parameter information is used to indicate the transmit end to perform the retransmission based on the at least one piece of retransmission parameter information.

According to a third aspect, an embodiment of this application provides an apparatus for implementing collision detection in data transmission. The apparatus is configured to perform the method according to any one of the first aspect or the possible implementations of the first aspect. Specifically, the apparatus for implementing collision detection in data transmission includes a module configured to perform the method according to any one of the first aspect or the possible implementations of the first aspect.

According to a fourth aspect, an embodiment of this application provides an apparatus for implementing collision detection in data transmission. The apparatus is configured to perform the method according to any one of the second aspect or the possible implementations of the second aspect. Specifically, the apparatus for implementing collision detection in data transmission includes a module configured to perform the method according to any one of the second aspect or the possible implementations of the second aspect.

According to a fifth aspect, an embodiment of this application provides a device for implementing collision detection in data transmission. The device includes a transceiver/transceiver pin and a processor, and optionally, further includes a memory. The transceiver/transceiver pin, the processor, and the memory communicate with each other through an internal connection path. The processor is configured to execute an instruction to control the transceiver/transceiver pin to send or receive a signal. The memory is configured to store the instruction. When the processor executes the instruction, the processor performs the method according to any one of the first aspect or the possible implementations of the first aspect.

According to a sixth aspect, an embodiment of this application provides a device for implementing collision detection in data transmission. The device includes a transceiver/transceiver pin and a processor, and optionally, further includes a memory. The transceiver/transceiver pin, the processor, and the memory communicate with each other through an internal connection path. The processor is configured to execute an instruction to control the transceiver/transceiver pin to send or receive a signal. The memory is configured to store the instruction. When the processor executes the instruction, the processor performs the method according to any one of the second aspect or the possible implementations of the second aspect.

According to a seventh aspect, an embodiment of this application provides a computer-readable medium, configured to store a computer program. The computer program includes an instruction used to perform the method according to any one of the first aspect or the possible implementations of the first aspect.

According to an eighth aspect, an embodiment of this application provides a computer-readable medium, configured to store a computer program. The computer program includes an instruction used to perform the method according to any one of the second aspect or the possible implementations of the second aspect.

According to a ninth aspect, an embodiment of this application provides a computer program. The computer program includes an instruction used to perform the method according to any one of the first aspect or the possible implementations of the first aspect.

According to a tenth aspect, an embodiment of this application provides a computer program. The computer program includes an instruction used to perform the method according to any one of the second aspect or the possible implementations of the second aspect.

According to an eleventh aspect, an embodiment of this application provides a chip. The chip includes a processing circuit and a transceiver pin. The transceiver pin and the processor communicate with each other through an internal connection path. The processor performs the method according to any one of the first aspect or the possible implementations of the first aspect, to control a receive pin to receive a signal, and to control a transmit pin to send a signal.

According to a twelfth aspect, an embodiment of this application provides a chip. The chip includes a processing circuit and a transceiver pin. The transceiver pin and the processor communicate with each other through an internal connection path. The processor performs the method according to any one of the second aspect or the possible implementations of the second aspect, to control a receive pin to receive a signal, and control a transmit pin to send a signal.

According to a thirteenth aspect, an embodiment of this application provides a system for implementing collision detection in data transmission. The system includes the transmit end and the receive end according to the first aspect and the second aspect.

BRIEF DESCRIPTION OF DRAWINGS

To describe technical solutions in embodiments of this application more clearly, the following briefly describes the accompanying drawings required for describing the embodiments of this application. Clearly, the accompanying drawings in the following descriptions show merely some embodiments of this application, and a person of ordinary skill in the art may still derive other drawings from these accompanying drawings without creative efforts.

DESCRIPTION OF EMBODIMENTS

The following clearly describes technical solutions in embodiments of this application with reference to the accompanying drawings in the embodiments of this application. Clearly, the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and the like are intended to distinguish between different objects, but are not used to describe a particular order of the objects. For example, a first target object, a second target object, and the like are used to distinguish between different target objects, but are not used to describe a specific order of the target objects.

In the embodiments of this application, the word such as "example", "for example", or the like is used to represent giving an example, an illustration, or a description. Any embodiment or design scheme described as an "example" or "for example" in the embodiments of this application should not be explained as having more advantages than another embodiment or design scheme. Exactly, use of the word "example", "for example", or the like is intended to present a related concept in a specific manner.

In descriptions of the embodiments of this application, unless otherwise stated, "a plurality of" means two or more. For example, a plurality of processing units are two or more processing units; and a plurality of systems are two or more systems.

Figure 1:
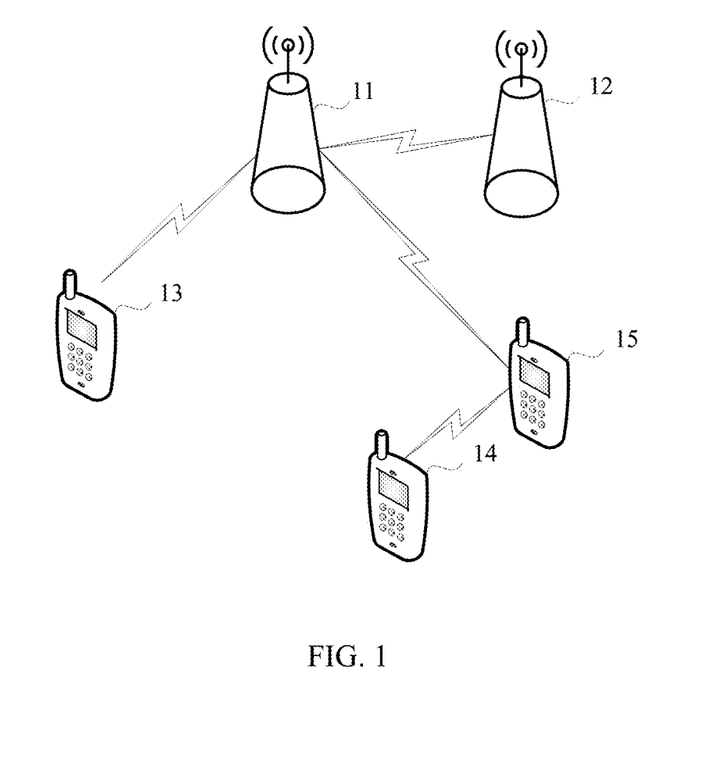
FIG. 1 is a schematic diagram of an application scenario according to an embodiment of this application.

Before the technical solutions in the embodiments of this application are described, an application scenario of the embodiments of this application is first described with reference to the accompanying drawings. FIG. 1 is a schematic diagram of an application scenario according to an embodiment of this application. The application scenario includes an AP 1 and an AP 2, which are sequentially numbered 11 and 12 in the figure. In addition, the application scenario also includes STAs 1-3 (where the STAs 1-3 refer to an STA 1, an STA 2, and an STA 3), which are sequentially numbered 13, 14, and 15 in the figure. In a specific implementation process of this embodiment of this application, the AP may be a device such as a router or a switch, and the STA may be a device such as a computer, a vehicle-mounted device, or a mobile terminal. It should be noted that during actual application, there may be one or more APs and one or more STAs. A quantity of APs and a quantity of STAs in the application scenario shown in FIG. 1 are only an illustrative example.

With reference to the schematic diagram of the application scenario shown in FIG. 1, the following describes specific implementation solutions of this application. In the embodiments of this application, a transmit end may be an AP or an STA, and a receive end may be an AP or an STA. To be specific, the method for implementing collision detection in data transmission in this application may be applicable to communication between APs, between an AP and an STA, and between STAs. In the following embodiments of this application, an example in which the AP 1 is used as the transmit end and the STA 1 is used as the receive end is only used for detailed description.

Scenario 1

Figure 2:
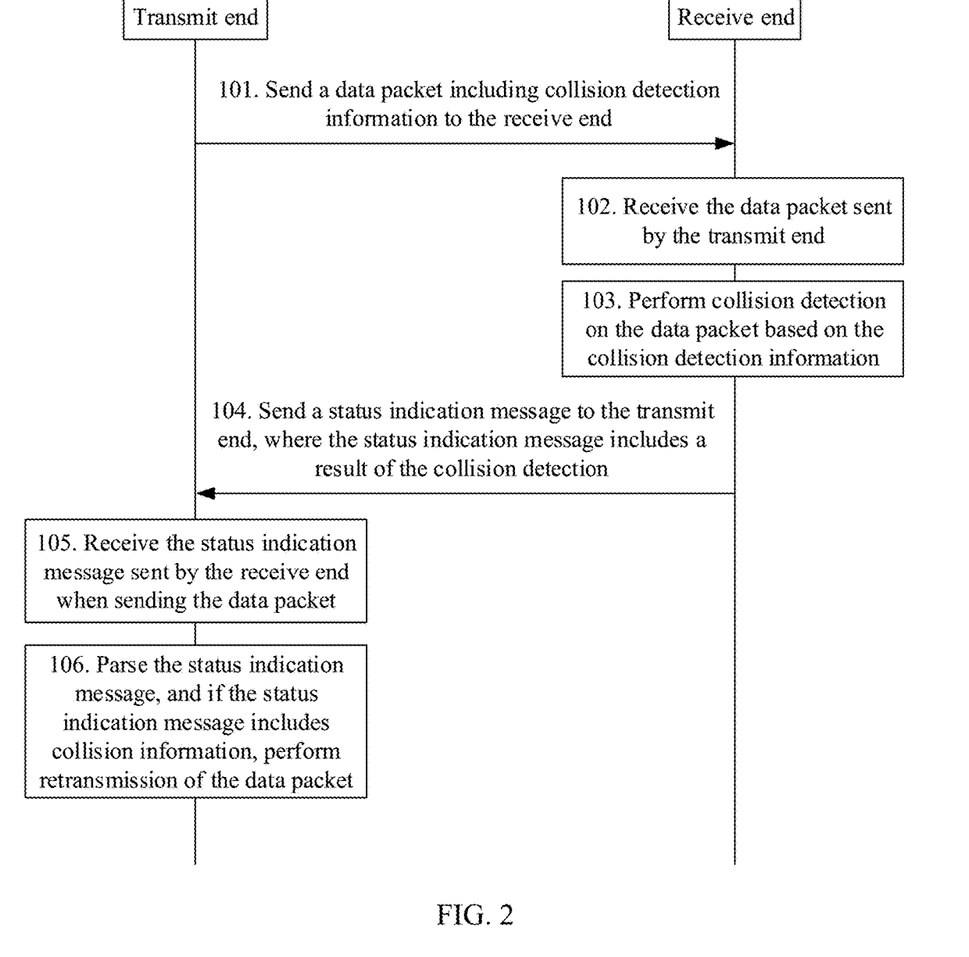
FIG. 2 is a first schematic flowchart of a method for implementing collision detection in data transmission according to an embodiment of this application.

With reference to FIG. 1, FIG. 2 is a schematic flowchart of a method for implementing collision detection in data transmission according to an embodiment of this application. The method in FIG. 2 includes the following steps.

S101. A transmit end sends a data packet including collision detection information to a receive end.

Figure 3:
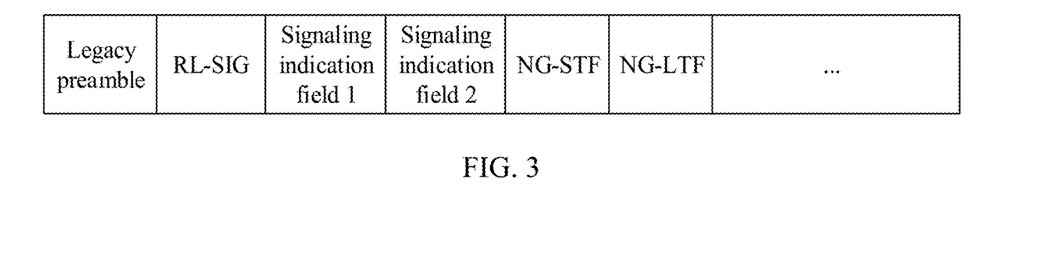
FIG. 3 is a schematic diagram of a frame structure of a physical layer preamble of a data packet according to an embodiment of this application.

Specifically, in this embodiment of this application, the transmit end may send the data packet including the collision detection information to the receive end, so that the receive end performs collision detection on the data packet based on the collision detection information in the data packet after receiving the data packet. In FIG. 2, an example in which the AP 1 is used as the transmit end and the STA 1 is used as the receive end is used for detailed description. Specifically, the AP 1 sends a data packet to the STA 1, and a physical layer preamble in the data packet may include collision detection information. FIG. 3 is a schematic diagram of a frame structure of a physical layer preamble of a data packet according to an embodiment of this application. In FIG. 3, the physical layer preamble includes a legacy physical layer preamble, a repeated legacy signal (RL-SIG) field, a signaling indication field 1, a signaling indication field 2, a next generation-short training field (NG-STF), and a next generation-long training field (NG-LTF). The signaling indication field 1 may include at least one piece of identity detection information. The identity detection information may be used to enable the receive end to perform identity detection based on the identity detection information, to determine whether the data packet is sent to the receive end. In an embodiment, the identity detection information includes but is not limited to: information used to uniquely identify the receive end, such as an application identifier (AID) or a basic service set identifier (BSSID). The signaling indication field 2 may include at least one piece of parameter detection information. The parameter detection information may be used to enable the receive end to perform the collision detection based on the parameter detection information when a result of the identity detection performed by the receive end based on the identity detection information is "success", to determine whether a collision event of the data packet exists. In an embodiment, the parameter detection information includes but is not limited to: a transmit opportunity parameter, a bandwidth parameter, and the like. It should be noted that, when the receive end decodes the parameter detection information, if interference or a collision exists (where the collision means that when the receive end receives the data packet sent by the transmit end, another transmit end also sends a data packet to the receive end), the receive end cannot successfully decode the parameter detection information. For a specific decoding process, refer to that in embodiments in the current technology. Details are not described again in this application. In this embodiment of this application, the signaling indication field 1 and the signaling indication field 2 separately use different cyclic redundancy checks (CRCs), so that the receive end can separately detect the signaling indication field 1 and the signaling indication field 2, and after the receive end fails to detect the signaling indication field 1, the receive end does not decode the parameter detection information in the signaling indication field 2, thereby further improving detection efficiency of the collision detection performed by the receive end. In addition, the signaling indication field 1 and the signaling indication field 2 use different CRCs, so that when the receive end successfully detects the identity detection information in the signaling indication field 1, that is, when the receive end determines that the data packet is sent to the receive end, if the receive end fails to decode the signaling indication field 2, the receive end can determine that a collision event of the data packet exists. In addition, in this embodiment of this application, the collision detection information is located in the physical layer preamble. Therefore, compared with the current technology in which identity detection information and parameter detection information are located in the middle of a media access control (MAC) layer, the receive end can preferentially decode the identity detection information and the parameter detection information, to determine, as soon as possible, whether a collision event of the data packet exists, and the transmit end can start a retransmission phase in time based on a feedback of the receive end, thereby improving channel utilization and data transmission efficiency.

S102. The receive end receives the data packet sent by the transmit end.

Specifically, in this embodiment of this application, after receiving the data packet sent by the transmit end, the receive end parses a physical layer preamble, and performs S103.

S103. The receive end performs the collision detection on the data packet based on the collision detection information.

Specifically, in this embodiment of this application, the receive end performs the collision detection on the data packet based on the collision detection information. For example, if a detection result is "failure" after the receive end performs the identity detection based on the identity detection information in the signaling indication field 1, that is, the data packet is not a data packet sent to the receive end, the receive end determines that a collision event of the data packet exists. If the receive end determines that the detection result is "success" after performing the identity detection based on the identity detection information in the signaling indication field 1, the receive end continues to decode the parameter detection information, and if decoding succeeds, the receive end continues to parse another part in the data packet. In an embodiment, that the receive end performs the collision detection on the data packet may alternatively be: The receive end determines whether a collision event of the data packet exists by calculating a signal to interference plus noise ratio (SINR) value. To be specific, after receiving the data packet, if the calculated SINR value fluctuates greatly compared with a previous SINR value, the receive end may determine that interference exists, that is, a collision event of the data packet exists. For a specific detection method, refer to the embodiments in the current technology. Details are not described again in this application. The receive end may alternatively use another detection method in combination with the method, in this embodiment of this application, of performing the collision detection on the data packet based on the collision detection information, to further improve the efficiency and accuracy of the collision detection.

S104. The receive end sends a status indication message to the transmit end, where the status indication message includes a result of the collision detection.

In an embodiment, if the receive end does not detect a collision event of the data packet, the receive end may perform no processing, and send an ACK message to the transmit end after the data packet is received.

In another embodiment, if the receive end is in a full-duplex mode, and the receive end does not detect a collision event of the data packet, the receive end may also send, to the transmit end when detecting that current channel quality is relatively poor, a status indication message including a modulation and coding scheme (MCS) or a channel quality indicator (CQI), to indicate the transmit end to perform transmission based on the status indication message including the MCS or the CQI during next transmission.

In still another embodiment, if the receive end detects that a collision event of the data packet exists, the receive end immediately sends a status indication message including collision information to the transmit end. If the receive end is in the full-duplex mode, the receive end may continue to receive the data packet (a premise is that the transmit end still continues to send the data packet), and send the status indication message including the collision information to the transmit end when receiving the data packet. If the receive end is in a half-duplex mode, the receive end immediately stops receiving the data packet, and sends the status indication message including the collision information to the transmit end.

In still another embodiment, if the receive end detects that a collision event of the data packet exists, the status indication message sent to the transmit end may further include at least one piece of retransmission parameter information in addition to collision information. The retransmission parameter information may be an MCS or a CQI, so that the transmit end retransmits the data packet based on the retransmission parameter information, thereby improving transmission quality and a success rate of retransmitting the data packet by the transmit end, and further improving the data transmission efficiency.

In addition, in an embodiment, the status indication message sent by the receive end may be in a form of a negative acknowledgement (NACK) message. The NACK message includes information indicating that the data packet fails to be received, that is the collision information. In another embodiment, the status indication message sent by the receive end may be in a form of a wireless transceiver status indicator (TSI). In addition to destination address information and source address information, the TSI further includes a 1-bit collision indication field, where the collision information is located in the field, and the collision information may be represented by 0 or 1. For example, 0 indicates that no collision exists, and 1 indicates that a collision exists. It should be noted that, if information in the collision indication field is 0, indicating no collision exists, the receive end may still send TSI information to the transmit end, where the TSI information may include an MCS or a CQI, indicating the transmit end to perform transmission based on the MCS or the CQI in the TSI during next transmission. Clearly, compared with the NACK, the TSI has an advantage of a simple structure, so that after receiving the TSI, the transmit end may learn, only by reading the information in the collision indication field, whether a collision event of the data packet exists currently, and may perform retransmission in time based on an indication, thereby further improving transmission efficiency of the data packet.

S105. The transmit end receives the status indication message sent by the receive end when sending the data packet.

Specifically, in this embodiment of this application, the transmit end is in the full-duplex mode. Therefore, when sending the data packet, the transmit end may monitor whether a status indication message returned by the receive end exists on a same channel or different channels on which the data packet is transmitted.

S106. The transmit end parses the status indication message, and if the status indication message includes the collision information, performs the retransmission of the data packet Specifically, in this embodiment of this application, after receiving the status indication message sent by the receive end, the transmit end parses the status indication message. In an embodiment, if the status indication message is transmitted in the form of the NACK message, a parsing process is: first determining, based on destination address information and source address information, whether the NACK message is sent by the receive end to the transmit end; and then, parsing the NACK message layer by layer, to obtain the collision information included in the NACK message, or the collision information and retransmission parameter information. In another embodiment, if the status indication message is transmitted in the form of the TSI, a parsing process is: directly obtaining the information in the collision indication field after verifying the destination address information and the source address information.

In this embodiment of this application, after parsing the status indication message, if the receive end determines that the status indication message includes the collision information indicating that a collision event of the data packet exists at the receive end, the receive end performs the retransmission of the data packet.

In an embodiment, the retransmission, of the data packet, performed by the transmit end may be: after stopping sending the data packet, sending the data packet to the receive end again. In this case, the receive end may be in the full-duplex mode, or may be in the half-duplex mode. In this embodiment of this application, working modes of all receive ends that establish communication connections to the transmit end are configured in a local configuration of the transmit end. In other words, the transmit end may learn whether a receive end works in the full-duplex mode or the half-duplex mode by querying the local configuration. For specific details in this embodiment, refer to specific descriptions in scenario 2.

In another embodiment, the retransmission, of the data packet, performed by the transmit end may be: continuing to send the data packet, and sending the data packet to the receive end again after the data packet is sent. In this case, the receive end is in the full-duplex mode, that is, the receive end may return the status indication message when receiving the data packet, and continue to receive the data packet. For specific details in this embodiment, refer to specific descriptions in scenario 3.

In addition, in this embodiment of this application, after the retransmission of the data packet, the transmit end repeats S101 to S106 until the data packet is successfully transmitted. That is, the transmit end receives an ACK message returned by the receive end. In an embodiment, if a quantity of retransmission times of the transmit end is greater than a threshold, the transmit end discards the data packet. An operator may set the threshold based on an actual requirement. This is not limited herein.

In conclusion, according to the method for implementing collision detection in data transmission in this embodiment of this application, the transmit end sends the data packet including the collision detection information to the receive end, so that after determining, based on the collision detection information, that a collision event of the data packet exists, the receive end can immediately send the status indication message including the collision information to the transmit end. In this way, the transmit end can learn in time that a collision event exists at the receive end, and immediately perform the retransmission, thereby shortening a waiting time, and improving channel utilization and the data transmission efficiency.

Scenario 2

Figure 4:
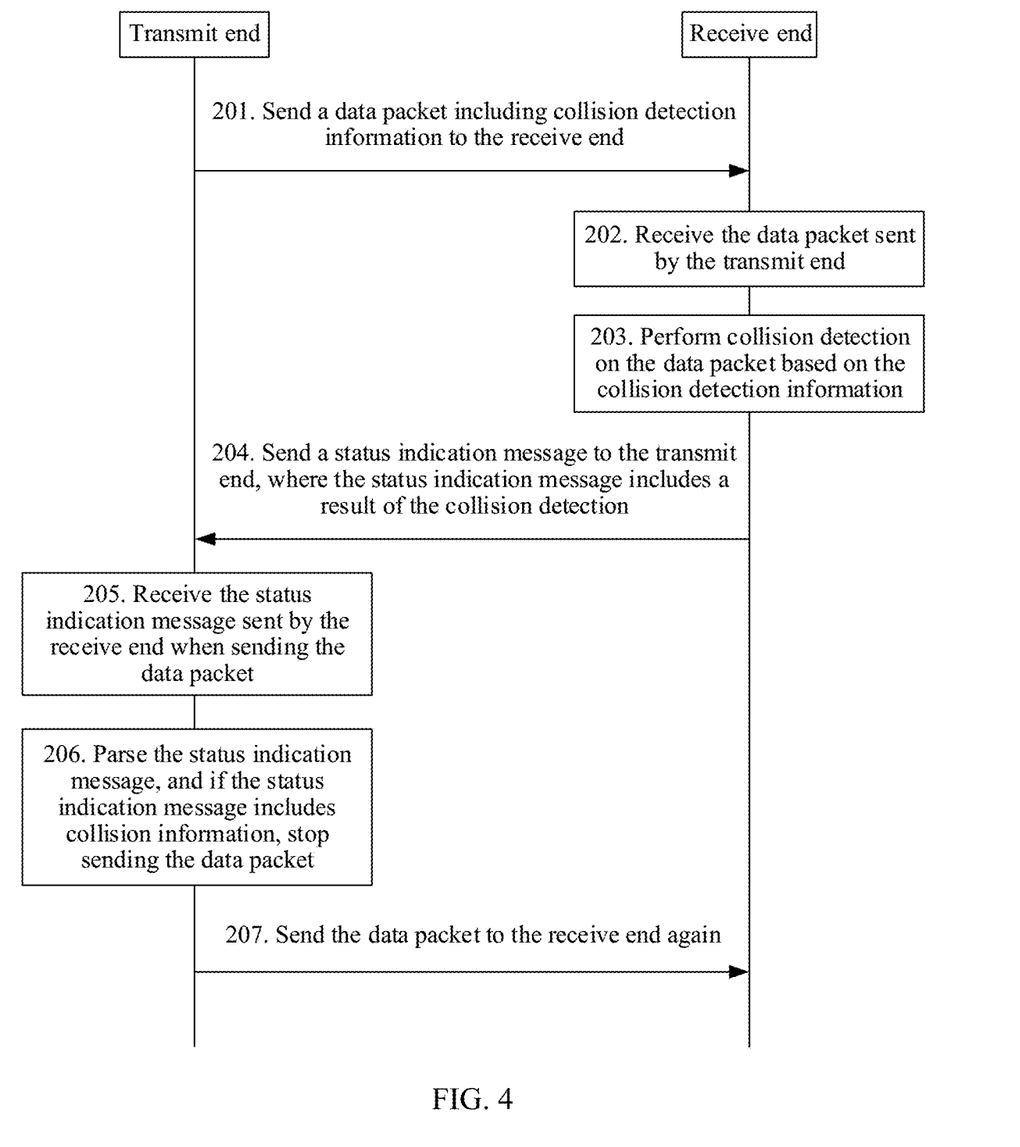
FIG. 4 is a second schematic flowchart of a method for implementing collision detection in data transmission according to an embodiment of this application.

With reference to FIG. 1, FIG. 4 is a schematic flowchart of a method for implementing collision detection in data transmission according to an embodiment of this application. The method in FIG. 4 includes the following steps.

S201. A transmit end sends a data packet including collision detection information to a receive end.

S202. The receive end receives the data packet sent by the transmit end.

S203. The receive end performs collision detection on the data packet based on the collision detection information.

S204. The receive end sends a status indication message to the transmit end, where the status indication message includes a result of the collision detection.

S205. The transmit end receives the status indication message sent by the receive end when sending the data packet.

For specific details of S201 to S205, refer to S101 to S105. Details are not described herein.

S206. The transmit end parses the status indication message, and if the status indication message includes collision information, stops sending the data packet.

Specifically, in this embodiment of this application, the transmit end parses the status indication message; and if it is determined, after parsing, that the status indication message includes the collision information, stops sending the data packet.

For a specific parsing process, refer to S106. Details are not described herein.

S207. Send the data packet to the receive end again.

Specifically, in this embodiment of this application, after stopping sending the data packet, the transmit end sends the data packet to the receive end again.

In an embodiment, after stopping sending the data packet, the transmit end may directly perform retransmission, that is, directly send the data packet to the receive end again without performing a backoff procedure, so that the transmit end may directly perform the retransmission without waiting for contention, thereby further improving transmission efficiency of the data packet.

In another embodiment, after stopping sending the data packet, the transmit end may send the data packet to the receive end again after the backoff duration. In an embodiment, for a method for determining the backoff duration, refer to a backoff mechanism specified in IEEE 802.11. Details are not described herein. In an embodiment, the transmit end may determine the backoff duration based on transmission information of a previous data packet. The previous data packet is a data packet that is most recently successfully sent by the transmit end, and the transmission information includes but is not limited to: a quantity of times that the transmit end retransmits the previous data packet, and a transmission efficiency value of the previous data packet. It should be noted that a premise for calculating the backoff duration by the transmit end by using the transmission information of the previous data packet is that the previous data packet is transmitted for a plurality of times by using the method for implementing collision detection in data transmission in this application and has been successfully transmitted to the receive end. Specifically, the transmit end may calculate a contention window (CW) according to the following formula. A size of the contention window is the backoff duration in this embodiment of this application. For example, if a value of the CW is 3, the transmit end backs off three times before sending the data packet, and used duration is the backoff duration.

$$CW1=(CW2+(1+A))*2-1$$

CW1 is a value of a contention window corresponding to a currently to-be-sent data packet, and CW2 is a value of a randomly selected contention window. For related details of randomly selecting a contention window, refer to embodiments in the current technology. This is not limited in this application. A in the formula is a calculation coefficient, and the calculation coefficient=a quantity of times of retransmitting a previous data packet*(ideal transmission duration of the previous data packet/actual transmission duration of the previous data packet). The calculation coefficient is an integer, for example, obtained through rounding up, and a value obtained from the ideal transmission duration of the previous data packet/the actual transmission duration of the previous data packet is a transmission efficiency value of the previous data packet in this embodiment of this application. The ideal transmission duration of the previous data packet may be calculated based on values such as an actual bandwidth size and a data packet size. For a specific calculation method, refer to the embodiments in the current technology. Details are not described again in this application. In an embodiment, the backoff duration calculation method may be further used before the step of "sending a data packet including collision detection information to a receive end" in S101, S201, and S301. That is, the transmit end sends the data packet to the receive end after the backoff duration.

In conclusion, in this embodiment of this application, after learning that a collision event of the data packet exists at the receive end, the transmit end immediately stops transmitting the data packet, and starts a retransmission procedure, thereby shortening a waiting time. In addition, the transmit end calculates the backoff duration by using the transmission information of the previous data packet, to increase the backoff duration. To be specific, a penalty measure is implemented on the data packet, so that the transmit end performs the retransmission after the backoff duration, to resolve a fairness problem between devices (where the fairness problem means: A transmit end that is not in a full-duplex mode still uses a method for implementing collision detection in data transmission in the current technology, to be specific, performs retransmission after the transmit end has not received an ACK within a preset time. However, in this application, the transmit end can learn of a collision at the receive end in time, and perform the retransmission. Therefore, the transmit end in this application can obtain a plurality of retransmission opportunities, so that the transmit end that uses the method for implementing collision detection in data transmission in the current technology is always in a waiting state, thereby causing the fairness problem).

Scenario 3

Figure 5:
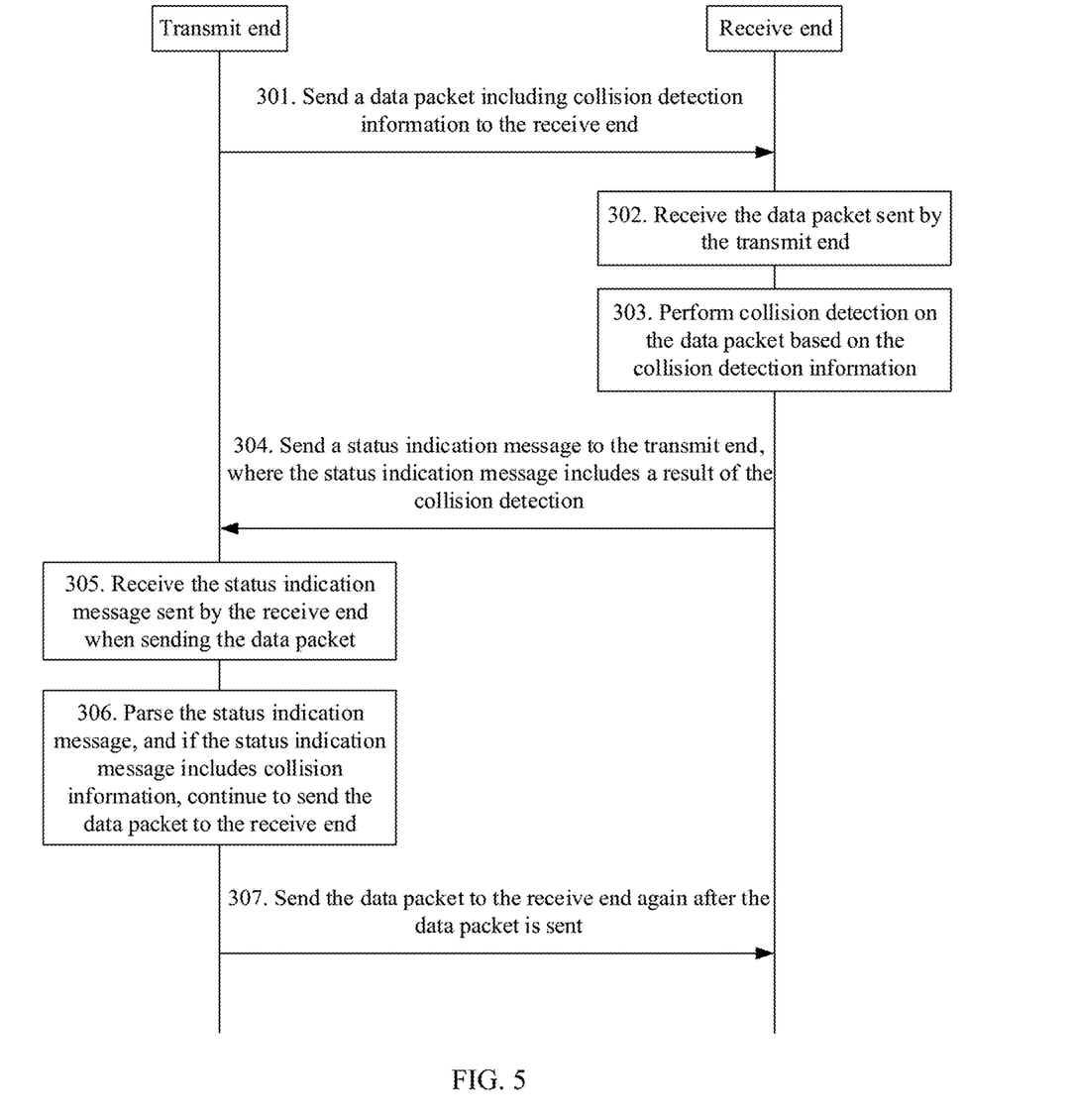
FIG. 5 is a third schematic flowchart of a method for implementing collision detection in data transmission according to an embodiment of this application.

With reference to FIG. 1, FIG. 5 is a schematic flowchart of a method for implementing collision detection in data transmission according to an embodiment of this application. The method in FIG. 5 includes the following steps.

S301. A transmit end sends a data packet including collision detection information to a receive end.

S302. The receive end receives the data packet sent by the transmit end.

S303. The receive end performs collision detection on the data packet based on the collision detection information.

S304. The receive end sends a status indication message to the transmit end, where the status indication message includes a result of the collision detection.

S305. The transmit end receives the status indication message sent by the receive end when sending the data packet.

S306. The transmit end parses the status indication message, and if the status indication message includes the collision information, continues to send the data packet to the receive end.

Specifically, in this embodiment of this application, the transmit end parses the status indication message, and if it is determined, after parsing, that the status indication message includes the collision information, the transmit end determines whether the receive end is in a full-duplex mode by detecting a local configuration. If the receive end is in the full-duplex mode, the transmit end may continue to send the data packet to the receive end. The receive end continues to receive the data packet, and buffers the data packet.

In an embodiment, when the receive end returns the status indication message, the status indication message may also carry information indicating the transmit end to continue to transmit the data packet, so that after receiving the status indication message, the transmit end may continue to send the data packet to the receive end based on an indication.

For a specific parsing process, refer to S106. Details are not described herein.

S307. Send the data packet to the receive end again after the data packet is sent.

For specific details of sending, by the receive end, the data packet to the receive end again after the data packet is sent, refer to S207. Details are not described herein again.

In this embodiment of this application, after receiving a data packet retransmitted by the transmit end, if a collision event of the data packet is not detected, the receive end buffers the retransmitted data packet, and decodes the data packet buffered in S306 and the retransmitted data packet together, thereby improving processing efficiency of the data packet at the receive end, and further improving overall data transmission efficiency. For specific details of decoding the two data packets together, refer to embodiments in the current technology. Details are not described again in this application.

It should be noted that an option of "stopping data packet transmission, and then performing the retransmission" in scenario 2 and an option of "continuing to transmit the data packet and performing the retransmission after transmission is completed" in scenario 3 may be configured in the local configuration of the transmit end. To be specific, after determining that a collision event of the data packet exists at the receive end, the transmit end may retrieve the local configuration to determine whether to "stop" sending the data packet or "continue" to send the data packet. If the transmit end is configured to "continue" to send the data packet, the transmit end further needs to determine that the receive end is in the full-duplex mode, and then performs an action of continuing to send the data packet.

The foregoing mainly describes the solutions provided in the embodiments of this application from a perspective of interaction between the network elements. It may be understood that, to implement the foregoing functions, the transmit end and the receive end include corresponding hardware structures and/or software modules for performing the functions. A person skilled in the art should easily be aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, division of function modules may be performed on the transmit end and the receive end based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division of the modules is an example and is merely logical function division. During actual implementation, another division manner may be used.

Figure 6:
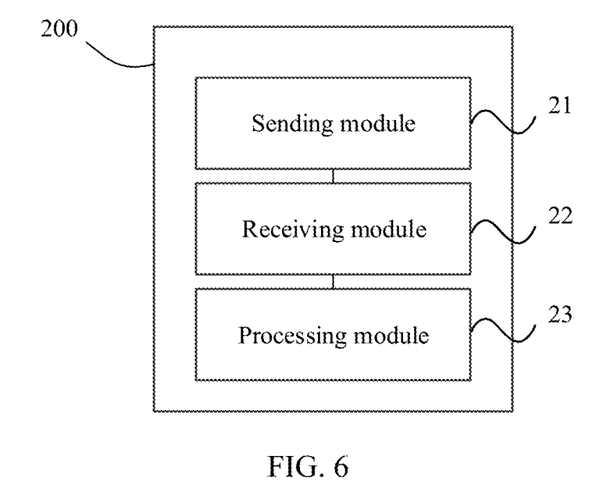
FIG. 6 is a schematic structural diagram of a transmit end according to an embodiment of this application.

When each function module is obtained through division based on each corresponding function, FIG. 6 is a possible schematic structural diagram of a transmit end 200 related to the foregoing embodiments. As shown in FIG. 6, the transmit end 200 may include: a sending module 21, a receiving module 22, and a processing module 23. The sending module 21 may be configured to send a data packet including collision detection information to a receive end. The collision detection information is used by the receive end to perform collision detection on the data packet. For example, the sending module 21 may be configured to support the transmit end in performing S101, S201, and S301 in the foregoing method embodiments. The receiving module 22 may be configured to receive a status indication message sent by the receive end when the data packet is sent. For example, the receiving module 22 may be configured to support the transmit end in performing S105, S205, and S305 in the foregoing method embodiments. The processing module 23 may be configured to: parse the status indication message; and if the status indication message includes collision information, control the sending module 21 to perform retransmission of the data packet. For example, the processing module 23 may be configured to support the transmit end in performing S106, S206, S207, S306, and S307 in the foregoing method embodiments.

Figure 7:
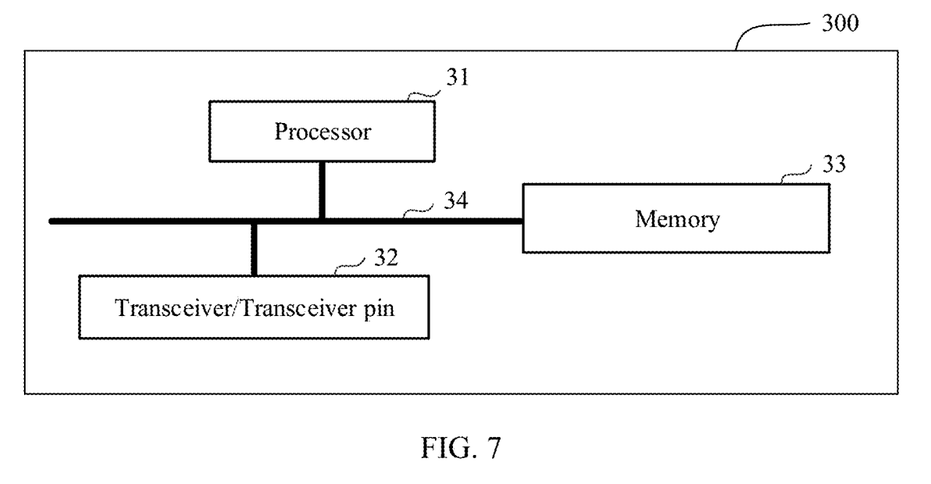
FIG. 7 is a schematic block diagram of a transmit end according to an embodiment of this application.

In another example, FIG. 7 is a schematic block diagram of another transmit end 300 according to an embodiment of this application. The transmit end 300 may include: a processor 31 and a transceiver/transceiver pin 32. Optionally, the transmit end further includes a memory 33. In this embodiment of this application, the processor 31 may be configured to parse a status indication message in the foregoing method embodiment, and when the status indication message includes collision information, control the transmit end 300 to perform retransmission of a data packet. For example, the processor 31 may be configured to support the transmit end in performing S106, S206, S207, S306, and S307 in the foregoing method embodiments.

The transceiver/transceiver pin 32 may be configured to receive signaling or data sent in S105, S205, and S305 in the foregoing method embodiments. The transceiver/transceiver pin 32 may be further configured to perform S101, S201, and S301 in the foregoing method embodiments.

Components of the transmit end 300 are coupled together by using a bus system 34. In addition to a data bus, the bus system 34 further includes a power bus, a control bus, and a status signal bus. However, for clear description, various types of buses are marked as the bus system 34 in the figure.

Optionally, the memory 33 may be configured to store an instruction in the foregoing method embodiments.

It should be understood that the transmit end 300 in this embodiment of this application may correspond to the transmit end in the methods of the foregoing embodiments, and the foregoing and other management operations and/or functions of the components in the transmit end 300 are intended to implement corresponding steps in the foregoing methods. For brevity, details are not described herein again.

Figure 8:
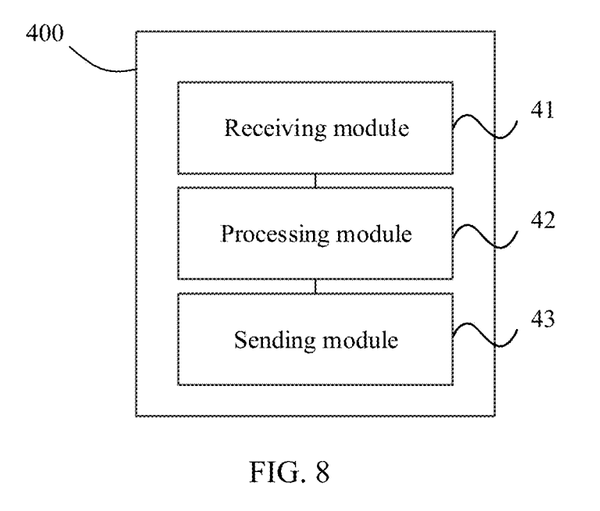
FIG. 8 is a schematic structural diagram of a receive end according to an embodiment of this application.

FIG. 8 is a possible schematic structural diagram of a receive end 400 related to the foregoing embodiments. As shown in FIG. 8, the receive end 400 may include: a receiving module 41, a processing module 42, and a sending module 43. The receiving module 41 may be configured to receive a data packet sent by a transmit end. The data packet includes collision detection information. For example, the receiving module 41 may be configured to support the receive end in performing S102, S202, and S302 in the foregoing method embodiments. The processing module 42 may be configured to perform collision detection on the data packet based on the collision detection information. For example, the processing module 42 may be configured to support the receive end in performing S103, S203, and S303 in the foregoing method embodiments. The sending module 43 may be configured to send a status indication message to the transmit end. The status indication message includes a result of the collision detection. For example, the sending module 43 may be configured to support the transmit end in performing S104, S204, and S304 in the foregoing method embodiments.

Figure 9:
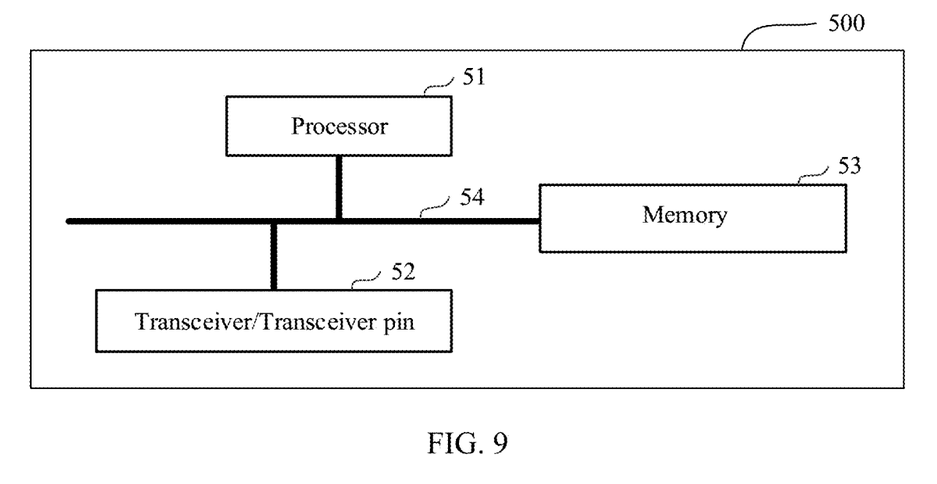
FIG. 9 is a schematic block diagram of a receive end according to an embodiment of this application.

In another example, FIG. 9 is a schematic block diagram of another receive end 500 according to an embodiment of this application. The receive end 500 may include: a processor 51 and a transceiver/transceiver pin 52. Optionally, the receive end 500 further includes a memory 53. In this embodiment of this application, the processor 51 may be configured to perform the step of performing the collision detection on the data packet based on the collision detection information in the foregoing method embodiments. For example, the processor 51 may be configured to support the receive end in performing S103, S203, and S303 in the foregoing method embodiments.

The transceiver/transceiver pin 52 may be configured to receive signaling or data sent in S102, S202, and S302 in the foregoing method embodiments. The transceiver/transceiver pin 52 may be further configured to perform S104, S204, and S304 in the foregoing method embodiments.

Components of the receive end 500 are coupled together by using a bus system 54. In addition to a data bus, the bus system 54 further includes a power bus, a control bus, and a status signal bus. However, for clear description, various types of buses are marked as the bus system 54 in the figure.

Optionally, the memory 53 may be configured to store an instruction in the foregoing method embodiments.

It should be understood that the receive end 500 in this embodiment of this application may correspond to the receive end in the methods of the foregoing embodiments, and the foregoing and other management operations and/or functions of the components in the receive end 500 are intended to implement corresponding steps in the foregoing methods. For brevity, details are not described herein again.

All related content of the steps in the foregoing method embodiments may be cited in function descriptions of corresponding function modules. Details are not described herein again.

Based on a same technical concept, an embodiment of this application further provides a computer-readable storage medium. The computer-readable storage medium stores a computer program, the computer program includes at least one segment of code, and the at least one segment of code may be executed by a transmit end and/or a receive end, so as to control the transmit end and/or the receive end to implement the foregoing method embodiments.

Based on a same technical concept, an embodiment of this application further provides a computer program. When the computer program is executed by a transmit end and/or a receive end, the computer program is used to implement the foregoing method embodiments.

The program may be completely or partially stored in a storage medium that is encapsulated with a processor, or may be completely or partially stored in a memory that is not encapsulated with a processor.

Based on a same technical concept, an embodiment of this application further provides a processor. The processor is configured to implement the foregoing method embodiments. The processor may be a chip.

Methods or algorithm steps described in combination with the content disclosed in the embodiments of this application may be implemented by hardware, or may be implemented by a processor executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, the storage medium is coupled to a processor, so that the processor can read information from the storage medium or write information into the storage medium. Certainly, the storage medium may be a component of the processor. The processor and the storage medium may be located in an application-specific integrated circuit (ASIC). In addition, the ASIC may be located in a network device. Certainly, the processor and the storage medium may exist in the network device as discrete components.

A person skilled in the art should be aware that in the foregoing one or more examples, functions described in the embodiments of this application may be implemented by hardware, software, firmware, or any combination thereof. When the functions described in the embodiments of this application are implemented by software, the foregoing functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The foregoing describes the embodiments of this application with reference to the accompanying drawings. However, this application is not limited to the foregoing specific implementations. The foregoing specific implementations are merely examples, but not limitations. Enlightened by this application, a person of ordinary skill in the art may derive many variants without departing from the principle of this application and the protection scope of the claims, and these variants shall fall within the protection scope of this application.

What is claimed is:

1. A communication apparatus, applied for implementing collision detection in data transmission, wherein the communication apparatus comprising:

at least one processor; and one or more memories coupled to the at least one processor and storing instructions for execution by the at least one processor to perform operations comprises:

sending a data packet comprising collision detection information to a receive end, wherein the collision detection information is used by the receive end to perform collision detection on the data packet, wherein the collision detection information comprises identity detection information, and the identity detection information is used to enable the receive end to check, based on the identity detection information, whether the data packet is sent to the receive end;

receiving a status indication message sent by the receive end when sending the data packet;

parsing the status indication message; and in response to determining that the status indication message comprises collision information, performing retransmission of the data packet.

2. The communication apparatus according to claim 1, wherein the collision detection information is located in a physical layer preamble of the data packet.

3. The communication apparatus according to claim 1, wherein:
- the collision detection information further comprises identity detection information and parameter detection information; and
- the parameter detection information is used to enable the receive end to perform the collision detection on the data packet based on the parameter detection information when the receive end determines that identity detection is successful.

4. The communication apparatus according to claim 1, wherein the status indication message comprises at least one piece of retransmission parameter information, and the at least one piece of retransmission parameter information is used to indicate the communication apparatus to perform the retransmission based on the at least one piece of retransmission parameter information.

5. The communication apparatus according to claim 1, wherein performing the retransmission of the data packet comprises:
- stopping sending the data packet; and
- resending the data packet to the receive end.

6. The communication apparatus according to claim 1, wherein performing the retransmission of the data packet comprises:
- continuing to send the data packet to the receive end; and
- resending the data packet to the receive end after the data packet is sent.

7. The communication apparatus according to claim 5, wherein resending the data packet to the receive end comprises:
- determining backoff duration of the data packet based on transmission information of a previous data packet, wherein the previous data packet is a data packet that is most recently successfully sent by the communication apparatus to the receive end, and the transmission information comprises a quantity of times that the communication apparatus retransmits the previous data packet to the receive end and a transmission efficiency value of the previous data packet; and
- sending the data packet to the receive end after the backoff duration.

8. A communication apparatus, applied for implementing collision detection in data transmission, wherein the communication apparatus comprising:
- at least one processor; and
- one or more memories coupled to the at least one processor and storing instructions for execution by the at least one processor to perform operations comprises:
  - receiving a data packet sent by a transmit end, wherein the data packet comprises collision detection information, wherein the collision detection information comprises identity detection information, and the identity detection information is used to enable the communication apparatus to check, based on the identity detection information, whether the data packet is sent to the communication apparatus;
  - performing collision detection on the data packet based on the collision detection information; and
  - sending a status indication message to the transmit end, wherein the status indication message comprises a result of the collision detection.

9. The communication apparatus according to claim 8, wherein the collision detection information is located in a physical layer preamble of the data packet.

10. The communication apparatus according to claim 8, wherein:
- the collision detection information further comprises parameter detection information; and
- the parameter detection information is used to enable the communication apparatus to perform the collision detection on the data packet based on the parameter detection information when the communication apparatus determines that identity detection is successful.

11. The communication apparatus according to claim 8, wherein the status indication message comprises at least one piece of retransmission parameter information, and the at least one piece of retransmission parameter information is used to indicate the transmit end to perform retransmission based on the at least one piece of retransmission parameter information.

12. A communication method, comprising:
- sending, by a transmitting apparatus, a data packet comprising collision detection information to a receiving apparatus, wherein the collision detection information is used by the receiving apparatus to perform collision detection on the data packet, wherein the collision detection information comprises identity detection information, and the identity detection information is used to enable the receiving apparatus to check, based on the identity detection information, whether the data packet is sent to the receiving apparatus;
- receiving, by the transmitting apparatus, a status indication message sent by the receiving apparatus when sending the data packet;
- parsing, by the transmitting apparatus, the status indication message; and
- in response to determining that the status indication message comprises collision information, performing, by the transmitting apparatus, retransmission of the data packet.

13. The communication method according to claim 12, wherein the collision detection information is located in a physical layer preamble of the data packet.

14. The communication method according to claim 12, wherein:
- the collision detection information further comprises parameter detection information; and
- the parameter detection information is used to enable the receiving apparatus to perform the collision detection on the data packet based on the parameter detection information when the receiving apparatus determines that identity detection is successful.

15. The communication method according to claim 12, wherein the status indication message comprises at least one piece of retransmission parameter information, and the at least one piece of retransmission parameter information is used to indicate the transmitting apparatus to perform the retransmission based on the at least one piece of retransmission parameter information.

16. The communication method according to claim 12, wherein performing the retransmission of the data packet comprises:
- stopping sending the data packet; and
- resending the data packet to the receiving apparatus.

17. The communication method according to claim 12, wherein performing the retransmission of the data packet comprises:
- continuing to send the data packet to the receiving apparatus; and
- resending the data packet to the receiving apparatus after the data packet is sent.

18. The communication method according to claim 16, wherein resending the data packet to the receiving apparatus comprises:
- determining backoff duration of the data packet based on transmission information of a previous data packet, wherein the previous data packet is a data packet that is most recently successfully sent by the transmitting apparatus to the receiving apparatus, and the transmission information comprises a quantity of times that the transmitting apparatus retransmits the previous data packet to the receiving apparatus and a transmission efficiency value of the previous data packet; and
- sending the data packet to the receiving apparatus after the backoff duration.

* * * * *

UNITED STATES PATENT AND TRADEMARK OFFICE
CERTIFICATE OF CORRECTION

PATENT NO. : 12,028,901 B2
APPLICATION NO. : 18/164278
DATED : July 2, 2024
INVENTOR(S) : Dandan Liang et al.

It is certified that error appears in the above-identified patent and that said Letters Patent is hereby corrected as shown below:

In the Claims

In Column 17, In Line 7, In Claim 3, after "comprises" delete "identity detection information and".

Signed and Sealed this
Fifth Day of November, 2024

Katherine Kelly Vidal
*Director of the United States Patent and Trademark Office*